(12) United States Patent
McWilliams

(10) Patent No.: X9606
(45) Date of Patent: Apr. 21, 1836

(54) STOVES, FOR CARRIAGES

(76) Inventor: Alexander McWilliams

Alexander M^c^Williams, Washington D.C.

Letters Patent.

The Schedule referred to in these Letters Patent and ~~making part of the~~ same, containing a description in the words of the said Alexander M^c^Williams himself of his Improvement in the Stove for Heating carriages and other Travelling Vehicles.

To all whom it may concern be it known that I, Alexander M^c^Williams, of the City of Washington in the District of Columbia have invented an improvement in the Stove for Heating Carriages and other travelling Vehicles, for which Letters Patent of the United States were originally granted to me bearing date the twenty ninth day of November eighteen hundred and thirty five. And I do hereby declare that the following is a full and exact description thereof, with my said improvement.

I make a small Stove for containing fuel, preferring Charcoal for this purpose, although Anthracite, or other Coal, may be employd. The stove may be square cylindrical, or otherwise as may be prefered, and should vary in its dimensions according to the size or closeness of the carriage, or other vehicle, to be warmed. For a close carriage of the ordinary size, when the cylindrical form is preferred, I have found one of sheet iron, or other metal, five inches in diameter, and five inches in hight is to be large enough to contain fuel sufficient for the consumption of four hours, producing during the whole time a general warmth.

The cylinder is shown at B, fig 1. in the accompanying drawing, it stands vertically on the bottom of the carriage, and, generally in, the centre thereof. The bottom of the cylinder is of sheet iron, or other metal, and an air pipe, or tube, C, descends from it through the bottom bottom of the carriage to admit a draught to the fire, this pipe or tube, may be six inches long, and either round or square; I prefer however, to make it quadrangular, and measuring about three inches by one inch and a half. One of its flat sides is perforated with holes at its lower end to admit air, and this side is turned towards the front of the carriage. For railroad cars, the cylinder B should be about twelve inches high, and ten in diameter, the air pipe, C. six inches long, eight wide and three deep. The fuel is not to be put immediately into the above described cylinder, but into one contained within it, which for the sized stove first described, should be about four inches and a half in diameter, and four in height, having grate bars at its lower end; a space of one fourth of an inch is thus left between the two cylinders, and an inch between their lower ends, which prevents the outer cylinder from being overheated. A top or cover, is fitted on to the upper end of the stove, which cover, also, I make double, with an air space between the two parts. A smoke or draught pipe, A. passes through the middle of the top, say of about one and a quarter inch in diameter, In rail road cars this pipe may be continued up and pass through the top of the car, but in carriages it should be bent twice at right angles, so as to return down alongside the stove, and pass through the bottom of the carriage.

When this stove is made square, as it is represented in the drawing, Fig 2. its dimensions may be deduced from what has been said of its capacity in the cylindri= cal form. It may be made in the form of a flat box, rising not more than three inches from the bottom of the carriage, so that the feet may be placed upon it. The top may, in this case, be made to slide, or be hinged, and secured down by thumb screws, readily removable when fuel is to be supplied See fig 2. A is the air pipe, or tube. B is an ash pit, which may be dispensed with, as the air pipe will answer this purpose.

C. the body of the stove. D. the door, or cover. E screws for
tightening it, and F the Smoke, or draught, pipe.
Instead of making the stove of double sheet Iron,
it may be made single, but then it should be lined
with some imperfect conductor of heat; or instead
of this the inner cylinder, or case, may be of cast iron
Instead of Coal, lamps for burning oil, or any of the
suitable Spiritous compounds, may be employed, but
I do not think them so convenient or so economical
as charcoal. Having thus fully described my said
invention and the improvement made thereon,
I do hereby declare that although I have included
in this instrument of writing a description of the
Machine as originally constructed by me, I have done
so for the purpose merely of shewing how my present improve-
-ment is connected therewith, and that all which I
now claim as constituting the said improvement, is the
addition to my carriage Stove, of a tube, or pipe for dischar-
ing the air which has passed through the fan, either
under the body of the carriage by securing the said pipe,
or by carrying it out through the top, or other part of
the carriage, substantially in the manner herein set
forth.

Witnesses
Chrell Keller
Thomas [illegible]

Alex. McWilliams

Ex [illegible]
Ch [illegible]

Drawing.

1008 [illegible]